United States Patent
Baker et al.

(10) Patent No.: US 6,405,204 B1
(45) Date of Patent: Jun. 11, 2002

(54) ALERTS BY SECTOR/NEWS ALERTS

(75) Inventors: David N. Baker; Steven M. Shum, both of San Francisco; John Parker, Tiburon, all of CA (US)

(73) Assignee: Sector Data, LLC, San Francisco, CA (US)

(*) Notice: Subject to any disclaimer, the term of this patent is extended or adjusted under 35 U.S.C. 154(b) by 0 days.

(21) Appl. No.: 09/428,298

(22) Filed: Oct. 27, 1999

Related U.S. Application Data

(63) Continuation-in-part of application No. 09/260,389, filed on Mar. 2, 1999.

(51) Int. Cl.[7] ............................................. G06F 17/30
(52) U.S. Cl. ........................... 707/100; 707/4; 707/9; 705/8; 705/36; 705/408; 709/224; 713/201; 379/57
(58) Field of Search ................................. 707/100, 104, 707/204, 4; 705/408, 8, 36, 37; 709/224; 379/57; 713/201

(56) References Cited

U.S. PATENT DOCUMENTS

| | | | |
|---|---|---|---|
| 4,334,270 A | 6/1982 | Towers | 364/300 |
| 4,412,287 A | 10/1983 | Braddock, III | 364/408 |
| 4,674,044 A | 6/1987 | Kalmus et al. | 364/408 |
| 4,677,552 A | 6/1987 | Sibley, Jr. | 364/408 |
| 4,751,640 A | 6/1988 | Lucas et al. | 364/408 |
| 4,903,201 A | 2/1990 | Wagner | 364/408 |
| 5,101,353 A | 3/1992 | Lupien et al. | 364/408 |
| 5,315,634 A * | 5/1994 | Tanaka et al. | 379/57 |
| 5,339,392 A * | 8/1994 | Risberg et al. | 345/762 |
| 5,414,838 A | 5/1995 | Kolton et al. | 395/600 |
| 5,500,793 A | 3/1996 | Deming, Jr. et al. | 364/401 |
| 5,590,325 A | 12/1996 | Kolton et al. | 395/615 |
| 5,655,088 A | 8/1997 | Midorikawa et al. | 395/237 |
| 5,778,357 A | 7/1998 | Kolton et al. | 707/2 |
| 5,799,287 A | 8/1998 | Dembo | 705/36 |
| 5,802,518 A * | 9/1998 | Karaev et al. | 707/9 |
| 5,806,047 A | 9/1998 | Hackel et al. | 705/36 |
| 5,806,049 A | 9/1998 | Petruzzi | 705/36 |
| 5,812,987 A | 9/1998 | Luskin et al. | 705/36 |

OTHER PUBLICATIONS

Hayashida, Robert D. et al., "Turbomachinery Monitoring Systems Capture and Analyze Vibration Data", IEEE Computer Applications in Power, vol. 4, Issue 3, Jul. 1991, pp. 38–43.*

Huhns, Michael N. et al., "Exploiting Expertise Through Networks", IEEE Internet Computing, vol. 3, Issue 6, Nov.–Dec. 1999, pp. 89–90.*

*Primary Examiner*—Hosain T. Alam
*Assistant Examiner*—Shahid Alam
(74) *Attorney, Agent, or Firm*—Michael A. Glenn

(57) ABSTRACT

The invention provides index performance alerts by sector. The index alerts are based on price performance measures of each industry, sector, sub-sector, or group (referred to collectively as "sector" herein.) Users are able to define limits for the industry, sector, sub-sector, or group categories for alerts on price, volume, intraday range, current closing price relative to the intraday range, price to revenues, price to earnings, price to book value, and price to cash flow. Users have the ability to define at least one area in a hierarchy of industry, sector, sub-sector, or group levels, for setting alerts. Users also can request tickers of individual companies. The invention also provides news alerts for a user selected hierarchy level and/or an individual ticker symbol. Users are alerted when a news story, linked to a user-specified group or ticker, is created. The invention uses a proprietary product/service hierarchy methodology for categorization of companies, wherein the categorization methodology automatically extends the functionality to deliver a plurality of other alert notifications associated with subsidiary classifications, constituent companies' classifications, or to securities instruments. A preferred implementation of communication delivery is standard e-mail as well as XML using push technology.

78 Claims, 12 Drawing Sheets

U.S. PATENT DOCUMENTS

| | | | | |
|---|---|---|---|---|
| 5,819,241 A | * | 10/1998 | Reiter | 705/408 |
| 5,873,071 A | | 2/1999 | Ferstenberg et al. | 705/37 |
| 5,893,079 A | * | 4/1999 | Cwenar | 705/36 |
| 5,930,806 A | * | 7/1999 | Taira et al. | 707/204 |
| 6,029,176 A | * | 2/2000 | Cannon | 707/104 |
| 6,035,285 A | * | 5/2000 | Schlect et al. | 705/30 |
| 6,154,738 A | * | 11/2000 | Call | 707/4 |
| 6,178,411 B1 | * | 1/2001 | Reiter | 705/408 |
| 6,192,112 B1 | * | 2/2001 | Rapaport et al. | 379/88.22 |
| 6,195,697 B1 | * | 2/2001 | Bowman-Amuah | 709/224 |
| 6,205,551 B1 | * | 3/2001 | Grosse | 713/201 |
| 6,219,648 B1 | * | 4/2001 | Jones et al. | 705/8 |
| 6,263,441 B1 | * | 7/2001 | Cromer et al. | 713/200 |

* cited by examiner

| Introduction to Indices | Indices by Sector | Index Gainers | Index Decliners | Most Active Indices | Calculation Method |

Index Decliners

| Industry Sector Subsector | Symbol | Last | Chg | 52 Week High | 52 Week Low | Today %Chg | Today Rank | Month to Date %Chg | Month to Date Rank | Quarter to Date %Chg | Quarter to Date Rank | %Chg | Rank |
|---|---|---|---|---|---|---|---|---|---|---|---|---|---|
| INDUSTRIES | | | | | | | | | | | | | |
| SHealthcare | HLTH | 2200.85 | | 3081.19 | 1320.51 | 15.01% | 5 | +1.45% | 12 | +12.54% | 24 | | |
| STechnology | TECH | 1958.58 | | 2742.10 | 1175.15 | % | 2 | +1.48% | 2 | +12.79% | 2 | | |
| SECTORS | | | | | | | | | | | | | |
| ⇩ Semiconductor Capitol Equip | SEMIC | 1852.55 | | 2593.71 | 1111.59 | 12.21% | 24 | +1.48% | 2 | +12.79% | 2 | | |
| ⇩ Datacommunications | SEMIC | 1852.55 | | 2593.71 | 1111.59 | 12.21% | 24 | +1.48% | 2 | +12.79% | 2 | | |
| SUBSECTORS | | | | | | | | | | | | | |
| Dermatology | DERMA | 1124.32 | | 1574.05 | 674.59 | % | 140 | +1.60% | 96 | +13.85% | 96 | | |
| Devices | DEVIC | 1124.32 | | 1574.05 | 674.59 | % | 140 | +1.60% | 96 | +13.85% | 96 | | |

*FIG. 7*

ALERTS BY SECTOR/NEWS ALERTS

This patent application is a Continuation-In-Part of D. Baker and S. Shum, Product/Service Hierarchy Database For Market Competition And Investment Analysis, Ser. No. 09/260,389, filed Mar. 2, 1999.

BACKGROUND OF THE INVENTION

1. Technical Field

The invention relates to information alerts. More particularly, the invention relates to an index and news alerts system, whereby alerts are delivered via standard e-mail or XML using push technology.

2. Description of the Prior Art

Data processing systems provide an efficient mechanism for storing and retrieving high volumes of data. They are particularly well suited for the investment and market analysis industry because of the overwhelming amount of raw data and analytical data applied to an investment decision. For example, some data relevant to a stock market investment decision are, to name a very few, price, change in price, price to earnings ratio, and the like.

It is critical for investors to monitor changes in their relevant data as quickly as possible. Investors can then promptly analyze reasons for the changes and then determine whether or not to act on the changes. For example, investors may decide to invest in an under-valued company, divest in an over-valued company, or remain at a current position.

In the prior art, one way investors are informed of changes in the market is by market instruments alerts. That is, if in a particular investment instrument a change measured against a set of criteria is detected, an investor is alerted about that change and usually by a type of computerized investment system. However, nowhere does a system exists that allows investors to set and receive alerts based on the metrics of groups of investment instruments.

C. R. Petruzzi, Data Processing System for Global Assessment of Investment Opportunity and Cost, U.S. Pat. No. 5,806,049 (Sep. 8, 1998) discloses a " . . . data processing system for determining a matrix of optimal investment portfolios based on globally accessed investment return and risk criteria. The system creates a global defined database of investment assets and investors. Asset and investor characteristics are established and applied to provide solutions to the ensuing linear relationships. These solutions are then individually applied to determine an optimal investment portfolio on an individualized basis."

Kolton et al, System for Forming Queries to a Commodities Trading Database Using Analog Indicators, U.S. Pat. No. 5,590,325 (Dec. 31, 1996), Kolton et al, System for Extracting Historical Market Information with Condition and Attributed Windows, U.S. Pat. No. 5,414,838 (May 9, 1995), and Kolton et al, Market Information Machine, U.S. Pat. No. 5,778,357 (Jul. 7, 1998), each disclose a " . . . computerized data retrieval system, especially for commodity price information databases, having a windowing system which aids a user in creating and revising formal search language queries, a database searching engine responsive to such queries, means to generate and format results in both textual and graphic reports, and a capacity for echoing a formal search language query to a display in a near-natural language format for easy comprehension by the user as the query is constructed using the windowing system. The system has facilities for including domain knowledge in a query, such as market knowledge of calendar events, national holidays, triple-witching hours, and option contract expiration dates. The system has additional facilities that permit a user to include more fundamental domain knowledge, such as dates of political elections, date of issuance and value of company earning reports, the consumer price index, and so on. The near-natural language format of the query may be created and revised either through the windowing system or with a text editor."

Midorikawa, et al, Electronic Market Transaction System for Detecting Orders Reaching a Prescribed Frequency of Failure to Increase Chance of Establishing Transactions, U.S. Pat. No. 5,655,088 (Aug. 5, 1997) discloses an electronic dealing system, which electronically performs matching processing between information on transaction orders placed by order side customers and information on transaction orders placed by hit side customers so as to establish transactions. The electronic dealing system detects orders for which hit requests have been made, but for which transactions have failed to be established for a long period of time and eliminates those orders from the electronic dealing market. Further, when transactions fail to be established due to factors other than the transaction price and the transaction amounts, other customers which would help establish the transactions between order side and hit side customers are found so as to increase the number of transactions which are established.

What is lacking in the above-referenced prior art, and in the commercial marketplace in general is a way to filter key qualitative criteria essential for accurate comparative valuation and peer-group analysis, and to provide alerts based on said criteria. That is, lacking are alerts based on, for example, classification of each competitors product or service, strategic partners, major customers, end-user markets served, regulatory agencies that affect the business, particular business strategy, and other such significant data.

It would be advantageous to provide alerts based on categorizations of companies, whereby the alerts functionality is automatically extended to subsidiary classifications, and/or to constituent company classifications, and/or to securities instruments.

It would also be advantageous to provide sector performance and news alerts based on a proprietary product/services-hierarchy database disclosed herein below, which organizes accurate comparable industry, sector, sub-sector, and group (hereafter referred to collectively as "sector") market performance and stock investment information centered around the products produced and services performed of each company and their true competitors. In the product/services-hierarchy database (herein referred to interchangeably as "product-hierarchy database"), each product or service type is created as an index that can be valued and measured.

SUMMARY OF THE INVENTION

A product-hierarchy database is provided that organizes and tracks company market performance and stock investment information by the products and services produced and offered by each competitor. The product hierarchy is created in the database independently of the companies. The companies that produce each product are then relationally linked to each product in the hierarchy that corresponds to a product produced or service performed by each company. An investment information service includes the product-hierarchy database and makes it accessible to investor and analyst subscribers through a query system across the Internet. Data entry personnel continually load qualitative and quantitative information about companies and their products through a product hierarchy generator connected to the product hierarchy database. Subscribers can punch-through to query individual data items, and they can find out what relationships exist between all the important aspects of the companies and the products being tracked. The invention also provides performance criteria by industry, sector, sub-sector, and group, thereby allowing industry, sector, sub-sector, and group-based qualitative assessment.

The invention provides index performance alerts by sector. The index alerts are based on price performance measures of each industry, sector, sub-sector, or group (referred to collectively as "sector" herein.) Users are able to define limits for the industry, sector, sub-sector, or group categories for alerts on price, volume, intraday range, current closing price relative to the intraday range, price to revenues, price to earnings, price to book value, and price to cash flow. Users have the ability to define at least one area in a hierarchy of industry, sector, sub-sector, or group levels, for setting alerts. Users can also request tickers of individual companies. The invention also provides news alerts for at least one user selected hierarchy level and/or an individual ticker symbol. Users are alerted when a news story, linked to a user-specified group or ticker, is created. The invention uses a proprietary, product/service hierarchy methodology for categorization of companies, wherein the categorization methodology automatically extends the functionality to deliver a plurality of other alert notifications associated with subsidiary classifications, constituent companies classifications, or to securities instruments. A preferred implementation of communication delivery is standard e-mail as well as XML using push technology.

BRIEF DESCRIPTION OF THE DRAWINGS

FIG. 7 is a report showing relative industry, sector, sub-sector, and group trends according to the invention;

DETAILED DESCRIPTION OF THE INVENTION

Figure 1:
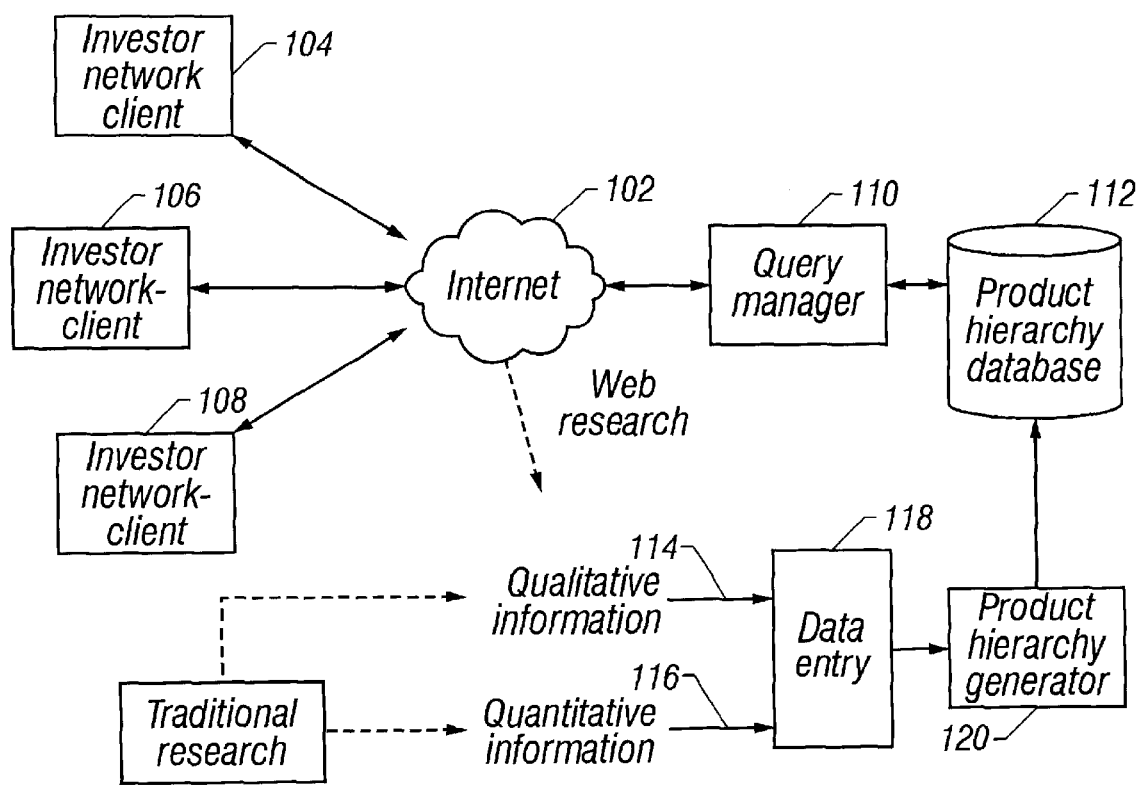
FIG. 1 is a block diagram illustrating a public company analysis system embodiment of the invention.

The preferred embodiment of the claimed invention disclosed herein uses a product/service hierarchy utilizing its proprietary classification methodology and database system that organizes companies into accurate comparable industry, sector, sub-sector and group (hereafter referred to collectively as "sector") classifications (see D. Baker and S. Shurm, Product/Service Hierarchy Database For Market Competition And Investment Analysis). The product/service-hierarchy methodology, system, and database also aggregates and organizes companies related market performance and investment (qualitative and sector specific) information centered on the products produced and services performed of each company and that of their true competitors, by product or service, and not by business description (such as in SIC codes). Each product or service type is created as an index. The index is comprised of all companies within a sector that produce the associated products or perform the associated services. These indices can then be valued and measured on a price basis, and sector averages for quantitative measures can be calculated.

The preferred embodiment of the claimed invention provides a unique, automated cross-referencing system through the proprietary product/service hierarchy. Alerts may be established on targeted companies or sectors. The availability of each product/service group as an index allows quantitative measures for each sector to be monitored and used as alert criteria. Furthermore, company interrelationships defined within the product/service hierarchy allow automated population of a list of related companies in the sector for alert notification. In other words, the claimed system provides a user with means to set, modify, and browse alert notifications using a proprietary product/service hierarchy methodology for categorization of companies, wherein the categorization facilitates automatically extending the functionality to other alert notifications associated with subsidiary classifications, constituent companies classifications, or to securities instruments.

In the preferred embodiment there are two types of alerts. They are News Alerts and Performance Alerts.

News Alerts

In the preferred embodiment, a user is allowed to subscribe to an alert system that provides a News Alert notification whenever a news item related to a particular company or sector is created.

News Alert by Company.

In the preferred embodiment, users are provided with a lookup functionality by ticker symbol or company name in order to search for companies for which they would like to set and receive News Alerts. The functionality allows users to subscribe automatically to related sectors, if desired. That is, users are provided with two choices:

send company related news ONLY; or send company related news AND send news that relates to all the sectors to which the company belongs.

News Alert by Sector.

In the preferred embodiment, users are provided with product browser functionality in order to select sectors for which they want to subscribe to News Alerts. The claimed invention provides propagation functionality that allows users to subscribe automatically to related sectors and companies, if desired. That is, users are provided with three choices, and the ability to select any combination of or even all three at the same time:

send sector related news ONLY; and/or send sector related news AND send news that relates to all the companies that belong to the sector; and/or send sector news AND send news that relates to all sub-sectors.

In the preferred embodiment, News Alerts are sent continuously. That is, a News Alert is sent each time a news item meets the selected criteria until such criteria is deleted by the user.

In the preferred embodiment, users may subscribe to multiple News Alerts on a same company or sector. Each of the multiple News Alerts is sent and received independently.

Performance Alerts

In the preferred embodiment, a user may subscribe to an alert system that provides a Performance Alert notification by company and/or by sector. Performance Alerts related to companies are referred to as Company Performance Alerts. Performance Alerts related to sectors are referred to as Sector Index Performance Alerts. There are two categories of both types of Performance Alerts:

First Category.

In the preferred embodiment, the first category is applicable to both Company Performance Alerts and Sector Index Alerts. Data for these alerts is monitored continuously and dynamically during the day, referred to as intraday. A Company Performance Alert or a Sector Index Alert is sent as soon as selected criteria is met. After an alert of the first category is triggered once in a day, the specific alert becomes inactive for the rest of the day. That is, the specific alert is not sent again during the same day. However, the specific alert is reactivated automatically each morning of a new day.

In the preferred embodiment, users, in addition, have the ability to reactivate an alert manually even when it has been deactivated by the alert system.

In the preferred embodiment, users are provided with the functionality to specify whether an Alert is to be monitored in absolute terms or relative to the closing price on a previous day. For relative alerts, users are able to specify a number of days ago. By default, zero days ago means close on the preceding day.

In the preferred embodiment, the first category comprises the following six items:

Price Change (for sectors, the preferred embodiment employs three calculated values: geometric average, arithmetic average, and market capitalization weighted average);

Volume Change (for sectors, the preferred embodiment uses simple average);

Price/Revenue (for sectors, the preferred embodiment uses simple average);

Price/Earnings (for sectors, the preferred embodiment uses simple average);

Price/Book Value (for sectors, the preferred embodiment uses simple average); and Price/Cash Flow (for sectors, the preferred embodiment uses simple average).

Second Category.

In the preferred embodiment, the second category is applicable to both Company Performance Alerts and Sector Index Alerts. Data for these alerts is monitored, and an alert is sent if criteria is met, but only at the end of the day.

In the preferred embodiment, users are provided with the functionality to specify alert parameters relative to the closing price on a previous day. Users are also able to specify the number of days ago. By default, zero days ago means close on the preceding day.

In the preferred embodiment, the second category comprises two items:

Intraday Range. Price only. Formula: (High−Low)/Open

Closing. Two values will be provided:

Percentage from Top. Formula: (High−Close)/(High−Low)

Percentage from Bottom. Formula: (Close−Low)/(High−Low)

In the preferred embodiment, users see a message "Alert me if this stock/index closes within the (Top) (Bottom) % of its intraday range" and select either a Top or Bottom radio button.

In the preferred embodiment, users may subscribe to multiple Performance Alerts on a same company or sector. Each of the multiple Performance Alerts is sent and received independently.

Transport

In the preferred embodiment, the alert system delivers alerts by e-mail using SMTP (Internet mail protocol).

Formats

In the preferred embodiment, three formats used to deliver alerts are available:

text;

HTML; and

XML.

It is noted that the claimed invention can be adapted to use many other types of formats and is not limited to the formats stated herein above.

Proprietary Product/Service Hierarchy Methodology and Database System

FIG. 1 illustrates a public company analysis system embodiment of the invention, and is referred to herein by the general reference, numeral 100. The system 100 operates over the Internet 102 and can support the securities investment informational needs of a plurality of investors, represented in FIG. 1 as investor network clients 104, 106, and 108. A query manager 110 appears as a Web page and interfaces the network clients 104, 106, and 108 with a product hierarchy database 112. Qualitative and quantitative information 114 and 116 about public traded companies and their products are input through a data entry system 118 to a product hierarchy generator 120. The qualitative and quantitative information 114 and 116 can come from Web-based research or traditional research based on documents and publications. The product hierarchy generator 120 builds a relational database in the database 112 that is structured by product.

Such database 112 is useful in the analysis of competing companies and their markets through the use of database relationships that are based on product hierarchies. Users are able to conduct comprehensive comparative valuation analysis by industry, sector, sub-sector, and group product.

Users can also obtain hierarchical industry, sector, sub-sector, and group profiles. A combination of qualitative and quantitative data queries can be supported. Database 112 preferably allows investors to conduct queries by searching on individual or multiple qualitative and quantitative categories. Database 112 preferably allows investors to conduct qualitative analysis of quantitative data and quantitative analysis of qualitative data. Database 112 can be used in securities analysis of publicly traded companies and to increase partnership investment performance.

An investment research database 112 provides qualitative and quantitative data for publicly,traded companies in a single source accessible via the Internet. Database 112 supports industry, sector, sub-sector, and group hierarchical classifications based on specific products or services. Queries through the Internet 102 allow users to see how specific companies are positioned by group within a particular industry, sector, sub-sector, as well as relative industry, sector, sub-sector, and group by industry, sector, sub-sector, and group performance.

The proper creation of industries, sectors, sub-sectors, and groups, and the proper classification of companies are essential for accurate comparative valuation and peer group analysis. The product hierarchy generator 120 categorizes all companies into appropriate industries, sectors, sub-sectors, and groups, and product areas according to a hierarchy within their respective industries. In this way, investor users can get accurate peer group analysis, relative valuation comparisons, and qualitative queries within a chosen industry, sector, sub-sector, or group. The hierarchy is built based on products produced or services performed within industries, which is a bottoms-up approach to company classification.

Figure 2:
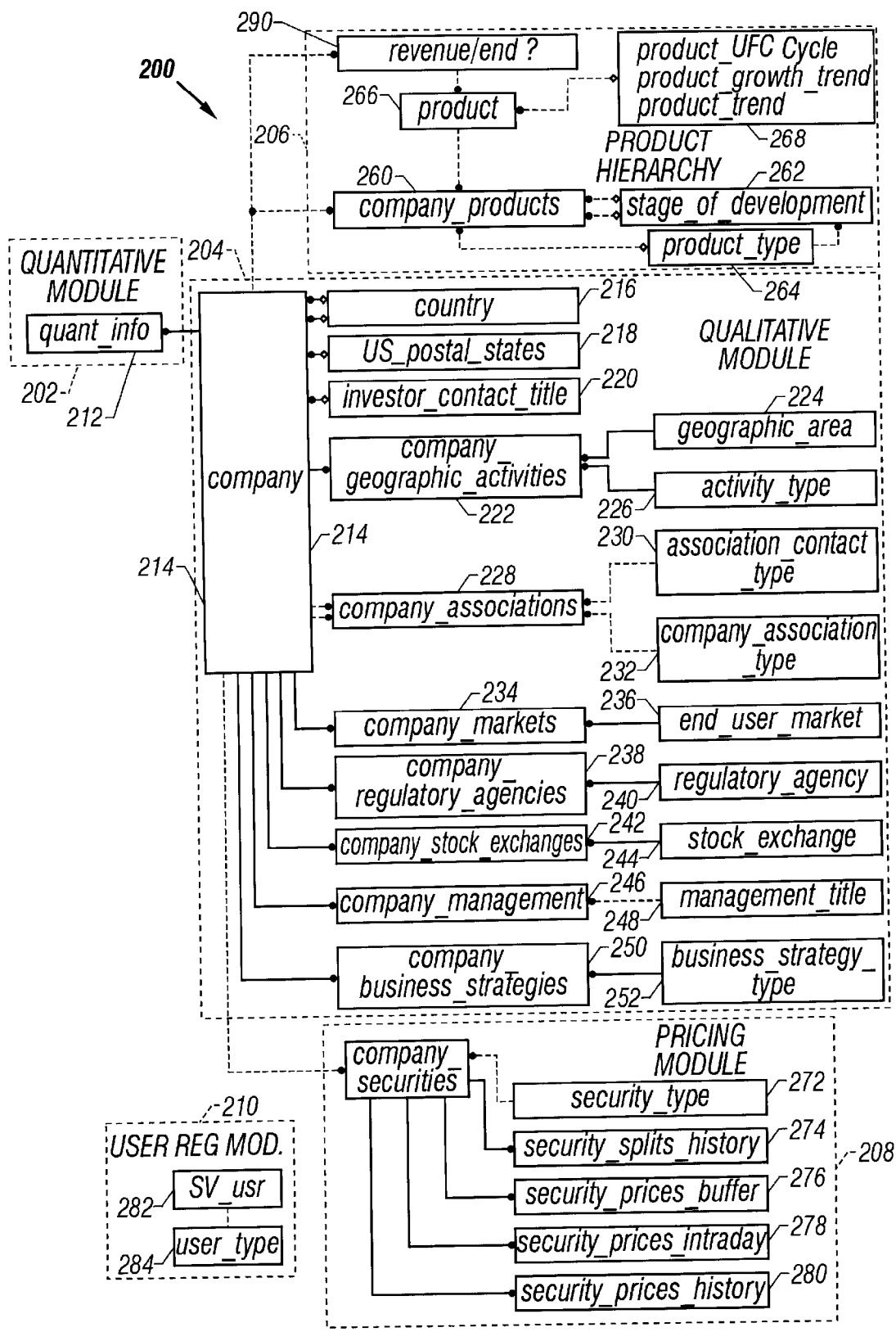
FIG. 2 is a block diagram illustrating a database structure embodiment of the invention.

FIG. 2 illustrates a database structure embodiment of the invention, and is referred to herein by the general reference numeral 200. The database structure 200 is equivalent to the database 112 (FIG. 1) and comprises a quantitative module 202, a qualitative module 204, a product hierarchy 206, a pricing module 208, and a user registration module 210. The quantitative module 202 includes one or more quantitative information records 212 that preferably have substantially all the data entry fields listed in Table I. Specialized applications may achieve good results using subsets of the information fields listed in Table I.

TABLE I (Quantitative Information)

CO_ID(FK)
RECORD_TYPE
RECORD_NO

| | | |
|---|---|---|
| year | quarter | derived_data_processed_flag |
| industr_code | repno | cusip |
| ticker | coname | split_date |
| split_factor | currency_code | currency_rate |
| fplen | fplenscf | fptyp |
| fpbegdt | fpenddt | updstatis |
| updstatbs | updstatcf | restdtis |
| restdtbs | restdtcf | fisperiod |
| revenue | interest_income_bank | premiums_earned |
| net_investment_income | realized_gains_losses | other_revenue |
| total_revenue | cost_of_revenue | losses_benefits_adjustments |
| amortization_of_policy_costs | fuel_expense | direct_operating_expenses |
| selling_general_admin_expenses | depreciation_and_amortization | research_and_development |
| interest_expense | other_operating_expenses | unusual_income_expenses |
| interest_expense_bank | loan_loss_provision | total_expenses |
| interest_income_non_operating | interest_expense_non_operating | interest_net_non_operating |
| afudc | non_interest_income | non_interest_expense |
| gain_loss_on_sale_of_assets | other_net | income_before_taxes |
| income_taxes | income_after_taxes | minority_interest_is |
| equity_interests_is | preferred_dividends | general_partner_distribution |
| us_gaap_adjustment | misc_earnings_adjustment | interest_adjust_primary_eps |
| adj_inc_avail_to_cmn_prim_eps | primary_eps_excl_xord_items | discontinues_operations |
| extraordinary_items | accounting_change | primary_ips_include_xord_items |
| dividends_per_common_share | primary_average_shares_outstnd | full_dilution_adjustment |
| fully_diluted_shares_outstnd | fd_eps_excl_xord_items | fd_eps_include_xord_items |
| cash_and_equivalents | cash_and_due_bank | other_short_term_investments |
| investments | loans | loan_loss_reserves |
| other_interest_earning_assets | accounts_receivable | inventory |
| prepayments_and_advances | deferred_policy_acqsn_costs | other_current_assets |
| total_current_assets | long_term_investments | utility_plant |
| utility_plant_depreciation | utility_plant_net | property_plant_equipment |
| accum_depreciation_and_amort | property_plant_equipment_net | goodwill_intangibles |
| deferred_charges | other_assets | other_long_term_assets |
| total_assets | accounts_payable | short_term_debt |
| deposits | other_interest_bearing_liab | policy_liabilities |
| curr_port_ltd_cap_lease_oblig | other_current_liabilities | other_liabilities |
| total_current_liabilities | long_term_debt | capitalized_lease_obligations |
| total_long_term_debt | minority_interest_bs | deferred_taxes |
| other_long_term_liabilities | total liabilities | redeemable_preferred |
| preferred_stock | common_stock | additional_paid_in_capital |
| retained_earnings | treasury_stock | other_equity |
| esop_debt_guarantee | total_shareholder_equity | shares_outstanding_period_end |
| net_income_scf | depreciation_scf | amortization_scf |
| deferred_taxes_indirect | other_non_cash_items | cash_receipts |

TABLE I-continued (Quantitative Information)

CO_ID(FK)
RECORD_TYPE
RECORD_NO

| | | |
|---|---|---|
| cash_payments | cash_taxes_paid | cash_interest_paid |
| other_operating_cash_flows | total_cash_from_operating_act | capital_expenditures |
| other_investing_cash_flows | total_cash_from_investing_act | dividends_paid |
| purchase_or_sale_of_stock | purchase_and_retirement_debt | other_financing_cash_flows |
| total_cash_from_financing_act | exchange_rate_effects | net_change_in_cash |
| cash-interest_paid_indirect | cash_taxes_paid_indirect | depreciation_amortization_scf |
| dividend_growth_5yr | revenue_growth_5yr | earnings_per_share_growth_5yr |
| revenue_per_employee | no_of_employees | avg_square_feet_space |
| sv_gross_profit | sv_gross_margin | sv_selling_gen_admin_percent |
| sv_research_anddev_prcnt | sv_total_expenses | sv_oprtng_income |
| sv_oprting_margin | sv_income_before_tax_mrgn | sv_tax_rate |
| sv_net_income_mrgn | sv_long_term_debt_to_capital | sv_long_term_debt_to_equity |
| sv_total_dept_to_equity | sv_working_capital | sv_curr_ratio |
| sv_quick_ratio | sv_oprtng_cash_flow_last_yr | sv_roe_trailing_4_quarters |
| sv_roe_last_5_fiscal_years | sv_roe_last_quarter | sv_roa_trailing_4_quarters |
| sv_roa_last_5_fiscal_years | sv_roa_last_quarter | sv_total_capital |
| sv_total_debt | sv_roic_trailing_4_quarters | sv_roic_last_5_fiscal_years |
| sv_roic_last_quarter | sv_cash_per_share | sv_dso_last_quarter |
| sv_dso_last_5_fiscal_years | sv_inventory_turnover_lst_qtr | sv_inventory_turnover_lst_yr |
| sv_oprtng_income_to_assets_tr | sv_book_value_per_share | sv_oprtng_cash_flow_trailing |
| sv_oprtng_cash_flow_share_tr | sv_oprtng_cash_flow_share_lfy | sv_pct_chng_gross_mrgn_seq |
| sv_pct_chng_gross_mrgn_yoy | sv_pct_chng_oprtng_mrgn_seq | sv_pct_chng_oprtng_mrgn_yoy |
| sv_pct_chng_income_mrgn_seq | sv_pct_chng_income_mrgn_yoy | sv_sales_per_share_trailing |
| sv_sales_per_share_lst_5_yr | sv_asset_turnover_trailing | sv_asset_turnover |
| sv_interest_coverage_lst_qtr | sv_interest_coverage_lst_5_yr | sv_revenue_growth_seq |
| sv_revenue_growth_yoy | sv_revenue_growth_1_year | sv_earn_per_share_growth_yoy |
| sv_earn_per_share_growth_seq | sv_earn_per_share_growth_1_yr | sv_1_yr_forward_eps_growth_rt |
| sv_market_capitalization | sv_current_price_to_earnings | sv_historical_per_ratio |
| sv_forward_per_ratio | sv_price_to_book_value | sv_price_to_sales_trailing |
| sv_price_to_sales_5fyr | sv_price_to_oprtng_cash_flow | sv_price_to_free_cash_flow |
| sv_current_per_ratio_to_growth | sv_forward_pe_ratio_to_growth | sv_free_cf_per_share_tr |
| sv_free_cf_per_share_ify | sv_price_to_free_cf_tr | sv_avg_gross_ppe_per_employee |
| sv_avg_gross_ppe_per_sqft | sv_debt_to_mkt_cap | sv_pct_chng_gross_mrgn_fy |
| sv_pct_chng_oprtng_mrgn_fy | sv_pct_chng_income_mrgn_fy | |

The data entry system 118 (FIG. 1) is used to load quantitative information 116 (FIG. 1) about particular companies in each field listed in Table I. The abbreviations and acronyms listed here are merely examples, and it will be obvious to most readers what these fields each represent. Typically, the balance sheet, income, and cash flow statement line items from the company's quarterly announcements are included in the data. From this, it is possible to use spreadsheet programs to compute various key operating ratios important to the investment community. Other information structures can also be used in alternative embodiments of the invention.

The qualitative module 204 includes one or more company records 214. Each such company record 214 preferably includes the data fields listed in Table II. There is a relational database linkage between the quantitative information records 212 and the company records 214.

TABLE II (Company Record)

ID

| | | |
|---|---|---|
| name | | |
| type_code | address_line 1 | address_line_2 |
| address_city | address_state(fk) | address_zip |
| address_country(fk) | phone_number | phone_fax_number |
| investor_contact_first_name | investor_contact_last_name | ictitle_ID(fk) |
| auditors_opinion | management_background | legal_proceedings_flag |
| legal_proceedings_notes | number_of_employees | web_site_address |
| email_address | minority_stub | minority_stub_percent |
| analysts_number | description | web_update_user_id |
| web_update_password | us_business_by_country(fk) | us_business_percentage |
| other_business_in_us | other_business_percentage | notes |
| scffmtcode | business_strategy_text | last_quant_q_rec |
| last_quant_y_rec | | |

Each company record 214 is associated within the qualitative module 204 with a country record 216, a us_postal_ states record 218, an investor_contact_title record 220, a company_geographic_activities record 222 that includes a geographic_area record 224 and an activity_type record 226, a company_associations record 228 that includes an association_contact_type record 230 and a company_ association_type record 232, a company_markets record 234 with an end_user_market record 236, a company_ regulatories_agency record 238 with a regulatory_agency record 240, a company_stock_exchanges record 242 with a stock_exchange record 244, a company_management record 246 with a management_title record 248, a company_business_strategies record 250, and a business_ strategy_type record 252. All records 216-252 have relational database linkages to the company record 214.

The country record, 216 preferably includes a name field and a note field. The us_postal_states record 218 preferably includes a postal code field and a name field. The investor_ contact_title record 220 preferably includes an identity (ID) field, a name field and a notes field. The company_ geographic_activities record 222 preferably includes company identity (co_ID), activity_ID, geographical are (geoarea_ID), percent of business (percent), and notes fields. The geographic_area record 224 preferably includes identity (ID), name, and notes fields. The activity_type record 226 preferably includes identity (ID), name, and notes fields. The company_associations record 228 preferably includes identity (ID), contact name, investment percentage, company ID for and to, coassnty_ID, and conty_ID fields. The association_contact_type record 230 preferably includes identity (ID), name, and notes fields. The company_association_type record 232 preferably includes name, and notes fields. The company_markets record 234 preferably includes company identity (co_ID), name, and object_ID fields. The end_user_market record 236 preferably includes identity (ID), name, and notes fields. The company_regulatories_agency record 238 preferably includes company identity (co_ID) and object ID fields. The regulatory_agency record 240 preferably includes identity (ID), name, and notes fields. The company_stock_ exchanges record 242 preferably includes company identity (co_ID) and object ID fields. The stock_exchange record 244 preferably includes identity (ID), name, and notes fields. The company_management record 246 preferably includes company identity (co_ID), order number, title ID, manager name, manager compensation, and notes fields. The management_title record 248 preferably includes identity (ID), name, and notes fields. The company_business_ strategies record 250 preferably includes company identity (co_ID) and object ID fields. The business_strategy_type record 252 preferably includes identity (ID), name, and notes fields.

The product hierarchy 206 has several records in a strict hierarchy that is built according to several critical rules. Such rules are described in detail below in connection with FIGS. 3–6. A company_products record 260 preferably includes fields for company ID, object ID, tradename, product-type ID, regulatory-agency stage ID, clinical stage ID, side effects, indications, identity (ID), and notes for every product or service that a particular company offers. A stage_of_development record 262 preferably includes identity (ID), product-type ID, name, and notes fields for every product or service that is recorded in the company_ products record 260. A product_type record 264 includes identity (ID), name, and notes field for every product or service that is recorded in the company_products record 260. A product record 266 includes independent fields for its own identity (ID), its parent's identity in the product hierarchy, the product name, the total available market, the trend identity (trend_ID), and notes. Product_life_cycle, product_growth_trend, and product_trend records 268 include identity (ID), name, and notes fields.

A revenue/end user market function 290 contains a revenue table that includes a percentage figure, and contains an end user market table that includes a list of available end user markets. The revenue table and end user market table are linked to the company record 214 and the product hierarchy 266. It is important to note that the revenue/end user market function may be linked to any level of the product hierarchy. This allows user selection of a most appropriate level in the product hierarchy to identify revenues and end user markets.

The product record 266 is unique in that it allows the construction of a hierarchy through the use of its parent identity field.

The pricing module 208 also comprises several records. A company securities record 270 preferably includes identity (ID), company identity (co_ID), security type ID, CUSIP number, and ticker symbol fields. A security_type record 272 preferably includes identity (ID), name, and notes fields. A security_splits_history record 274 preferably includes company security identity (COSEC_ID), split date, and split factor fields. A security_prices_buffer record 276 preferably includes company security identity (COSEC_ ID), stock symbol type, cusip number, ticker, last price, time of last price, 52-week high, 52-week low, earnings estimates, and price-changed-flag fields. A security_ prices_intraday record 278 preferably includes identity (ID), name, and notes fields. A security_prices_history record 280 preferably includes price date, company security identity (COSEC_ID), last price, time of last price, 52-week high, 52-week low, earnings estimates, and price-changed-flag fields.

The user registration module 210 includes a subscriber (SV_user) record 282 and a user_type record 284. The SV_user record 282 preferably includes user type ID, nickname, password, user name, phone, and e-mail fields. The user_type record 284 preferably includes fields for name and notes. The user registration module 210 is used to enroll and validate investor network-clients 104, 106, and 108 (FIG. 1) when they log-on to the query manager 110 over the internet 102.

In operation, a query can be constructed by query manager 110 (FIG. 1) to find all relations to a particular field content in a particular record. For example, the company_ regulatories_agencies record 238 can be used to list all companies in the database 200 that share the same regulatory agencies.

The product hierarchy 206 (FIG. 2) includes a company_ products record 260 with links to a stage_of_development record 262 and a product_type record 264. Each company_ products record 260 is linked to one or more records 266 for each product, and each product_life_cycle, product_ growth_trend, and product_trend record 268 is linked to one or more records 266 for each product.

The product hierarchy 206 includes all the products of all the companies in the database 200 in as many product records 266 as are necessary. The product hierarchy 206 can span all, industry, sector, sub-sector, and groups and is based solely on the products or services that are produced by each competing company.

Fundamentally, each new; product hierarchy chain is created in the database 200 according only to a product manufactured or a service performed, and must be completely independent of any other factor. A hierarchical breakdown within any industry, sector, sub-sector, or group is independent of the constituent companies themselves. Only their individual products and services matter. Accordingly, all such companies are associated at a particular product level based upon products manufactured or services performed and not dependent on a company's self-described business description.

Each such hierarchy begins at its top with broad product types, and scales down and branches out to very specific products. Any relationships that exist between product levels is preferably handled in a record, e.g. by assigning a parent identity and level number to each product. An unlimited number of product levels can be created in an industry, sector, sub-sector, or group within a product hierarchy.

When a new product level in a hierarchy is created, it is attached as a subset of a previous level or category and is related by association. Every other lower and subsequent product level is associated, linked, or related to some other higher level in the chain of the product hierarchy 206, except at the highest level.

Two separate products, represented in two product records 266 on the same level, may be attached or related to a single parent or higher level in the product hierarchy 206. Constructed this way, the two products can be related to one another. However, two products at the same level with the same parent are never directly linked or made dependent on the other. A product level can have an unlimited number of sub-product levels attached below it.

Figure 3:
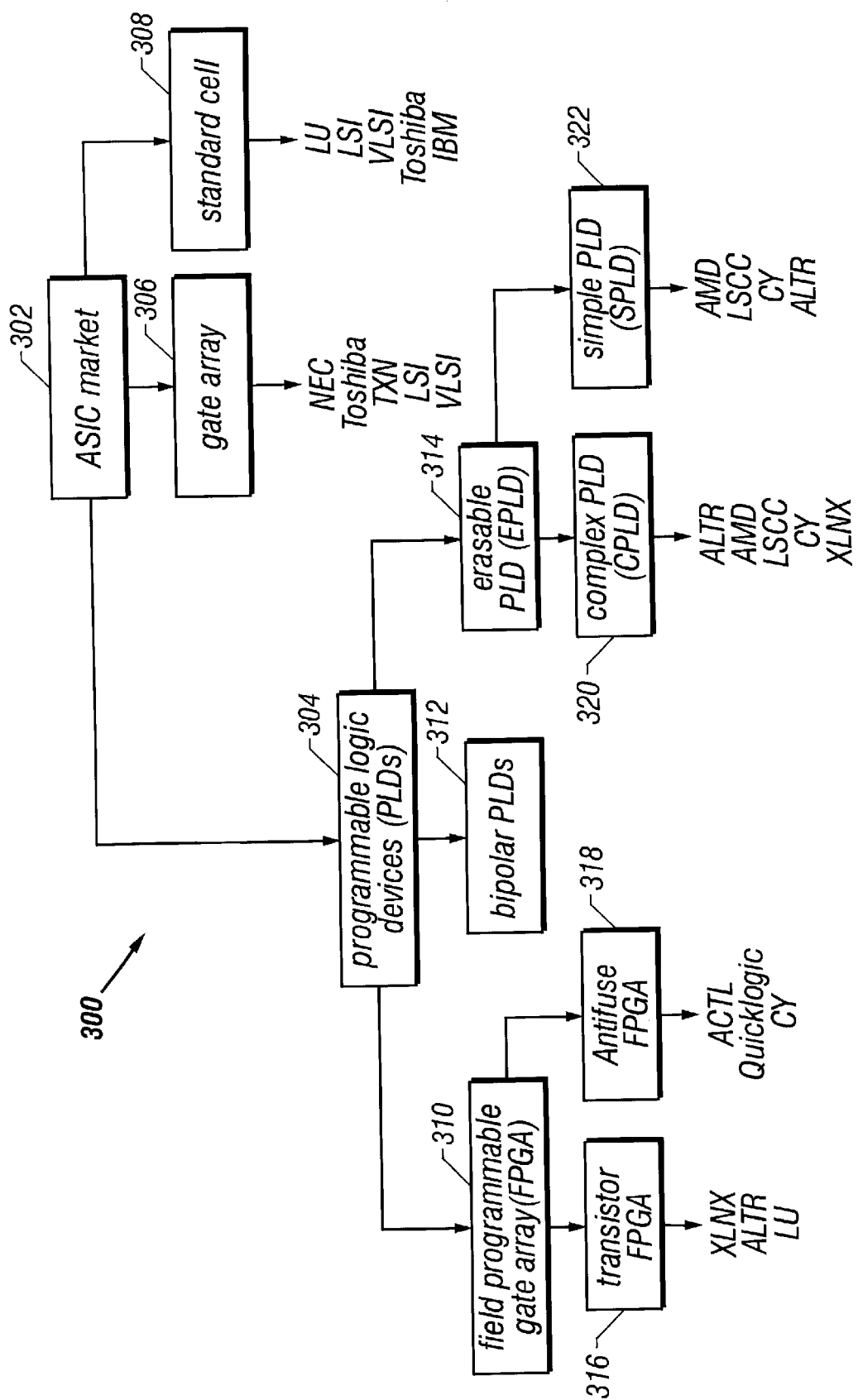
FIG. 3 is a block diagram of a product hierarchy methodology of the invention at its top level providing, as an example, the whole of the application specific integrated circuit (ASIC) market.

Consider FIG. 3. A product hierarchy 300 represents at its top level 302 the whole of the application specific integrated circuit (ASIC) market. The components of the ASIC market include, at lower levels, the programmable logic devices (PLD's) level 304, a gate array level 306, and a standard cell level 308. Individual gate array products attached to gate array level 306 are produced by well-known companies: NEC, Toshiba, Texas Instruments, LSI Logic, and VLSI Systems. Individual standard cell products attached to standard cell level 308 are produced by LU, Toshiba, LSI Logic, and IBM. Lower levels are needed in the PLD industry, sector, sub-sector, and group, so a field programmable gate array (FPGA) level 310, a bipolar PLD level 312, and an eraseable PLD level 314 are needed in the product hierarchy 300. The FPGA industry, sector, sub-sector, and group is further divided into a transistor FPGA level 316 and an antifuse FPGA level 318. These two product areas include products from Xilinx, Altera, and LU, and also Actel, Quicklogic, and Cypress Logic, respectively. The eraseable PLD level 314 is split into complex PLD level 320 and a simple PLD level 322.

Figure 4:
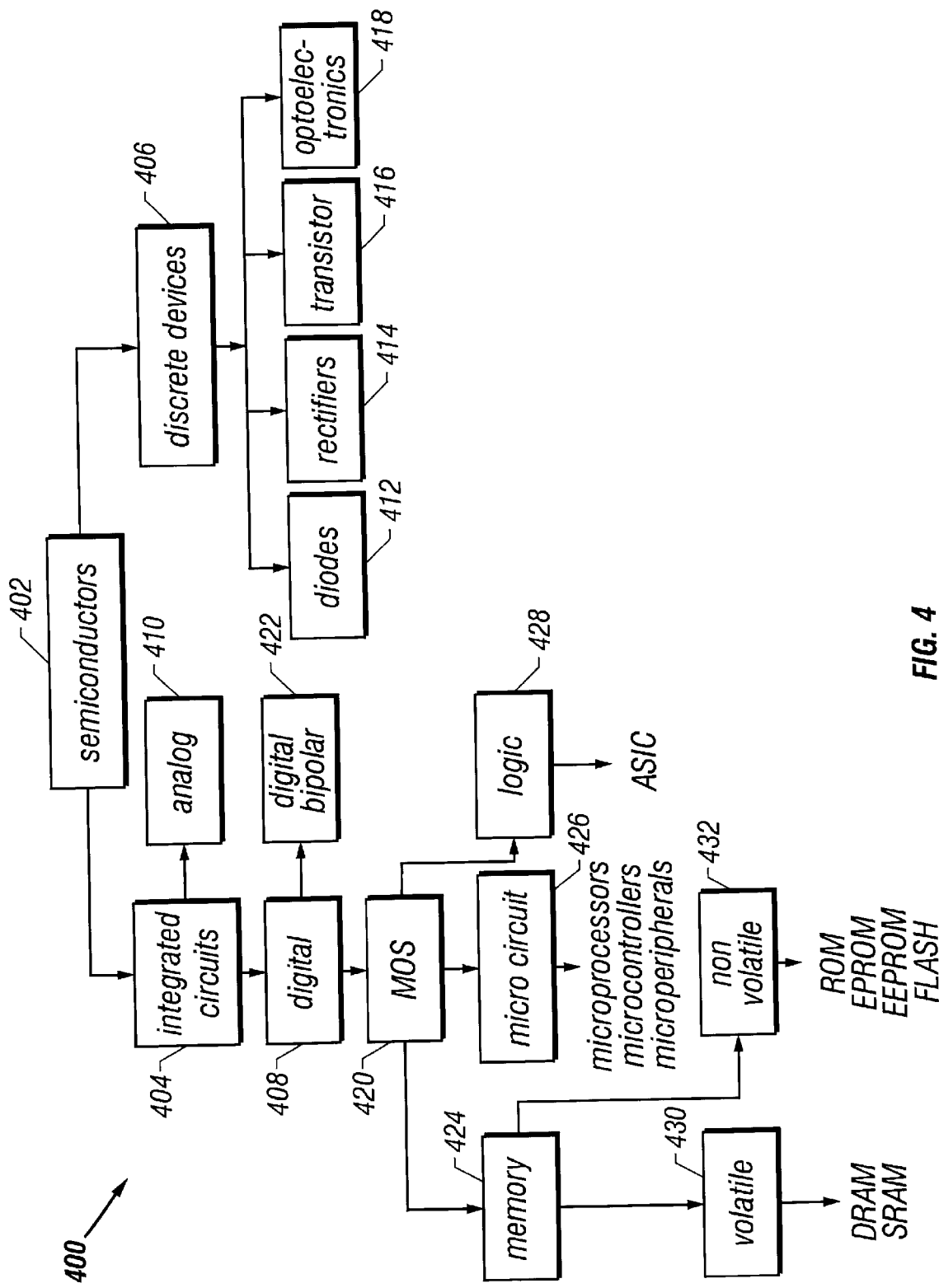
FIG. 4 is a block diagram that illustrates another product hierarchy according to the invention, showing how the product hierarchy can be used to drill down to increase specificity of the product area or drill up for a broader look at the product market.

FIG. 4 illustrates a product hierarchy 400 in a further example. A semiconductor level 402 includes an integrated circuits (IC) level 404 and a discrete devices level 406. The IC level 404 is divided into a digital IC level 408 and an analog IC level 410. The discrete devices level 406 has as its constituents, a diodes level 412, a rectifiers level 414, a transistors level 416, and an opto-electronics level 418. The digital level 408 is split between a metal-oxide semiconductor (MOS) level 420 and a digital bipolar level 422. The MOS level 420 has beneath it a memory level 424, a microcircuit level 426, and a logic level 428. The top of the ASIC level 302 (FIG. 3) could be attached to the logic level 428 (FIG. 4) in this example. The memory level 424 is further divided into a volatile memory level 430 and a non-volatile memory level 432.

There is an important difference between the product hierarchy 206 and individual companies. The product hierarchy is created independent of companies. Products that make up the product hierarchy are called product levels. Individual company products are referred to as company products and are specific to the company itself. There are several data items that are also tied to the individual company specific products and include brandname or tradename, revenue percentage, and end-user markets.

Figure 5:
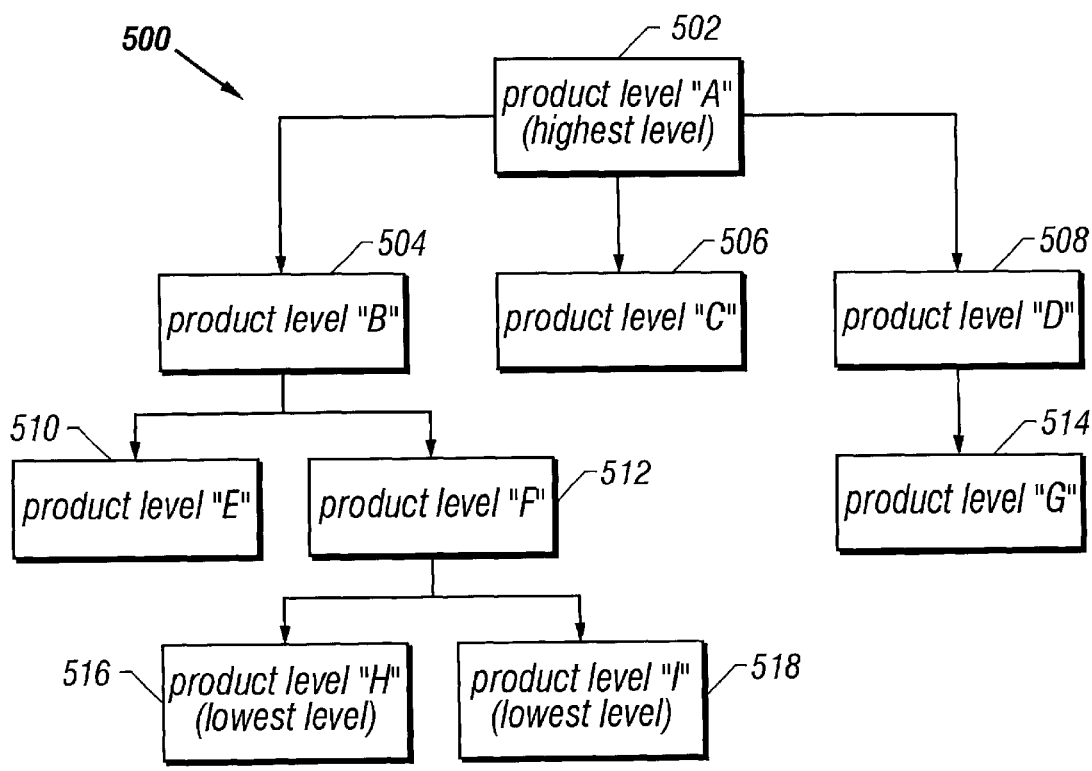
FIG. 5 is a block diagram that illustrates still another product hierarchy, beginning with broad product types at top level and scaling down and branching out to very specific products.

FIG. 5 represents a generalized product hierarchy 500. The product hierarchy begins with broad product types at top level "A" 502, and scales down through levels 504–518 and branches out to very specific products. Companies can only be directly linked to the lowest level in the hierarchy, but are then identified with higher levels because the parent levels in the hierarchy are directly linked to the lower levels. The relationships that exist between product levels is preferably memorialized in one lookup record using a method of assigning a parent identity and level number to each product. An unlimited number of product levels 502–518 can be created in an industry, sector, sub-sector, and group within the product hierarchy 500. When a new product level in the product hierarchy 500 is created, it then becomes a subset of the previous level/category and is related by association. With the exception of the highest level, every other lower and subsequent product level is associated/linked/related to some other higher level in the chain of the product hierarchy.

Referring to FIG. 5, a company cannot be attached to product level "D" 508 because a lower product level "G" 514 exists. A company may be attached to product level "G" 514 because it is a bottom level. Companies and other company product specific qualitative aspects can be attached to product level "I" 518, for example. Thus, product level "H" 516 could have attached to it, product 1 of company 1 or product 1 of company 2 with tradename/brandname 1.

A company, and thus the brandname or tradenames of its products, can only be attached, or associated at the lowest, node level of the product hierarchy. Any company may have multiple products with multiple brandname or tradenames assigned to the same level in the product hierarchy 206 of a particular industry, sector, sub-sector, or group. In addition, a company and its products brandname or tradename may be attached at an unlimited number of lowest product levels in the product hierarchy, and across different industries, sectors, sub-sectors, and groups. An unlimited number of companies and thus products, brandnames or tradenames can be attached, associated to one lowest level in the product hierarchy 206. A company with multiple products can exist at multiple product levels, and in multiple product hierarchies in multiple and different industries, sectors, sub-sectors, and groups.

Once a product level has been created, there cannot be a link between it and a company at a higher level. A company and its product brandname or tradename can only be linked at the lowest node of the product hierarchy 206. In other words, a particular product record 266 that is named as a parent to another product record 266 cannot be attached to a company_products record 260. Companies can be associated to higher levels by default due to the associations that are created by the product hierarchy 206 itself through the parent relationships that the hierarchy uses.

Figure 6:
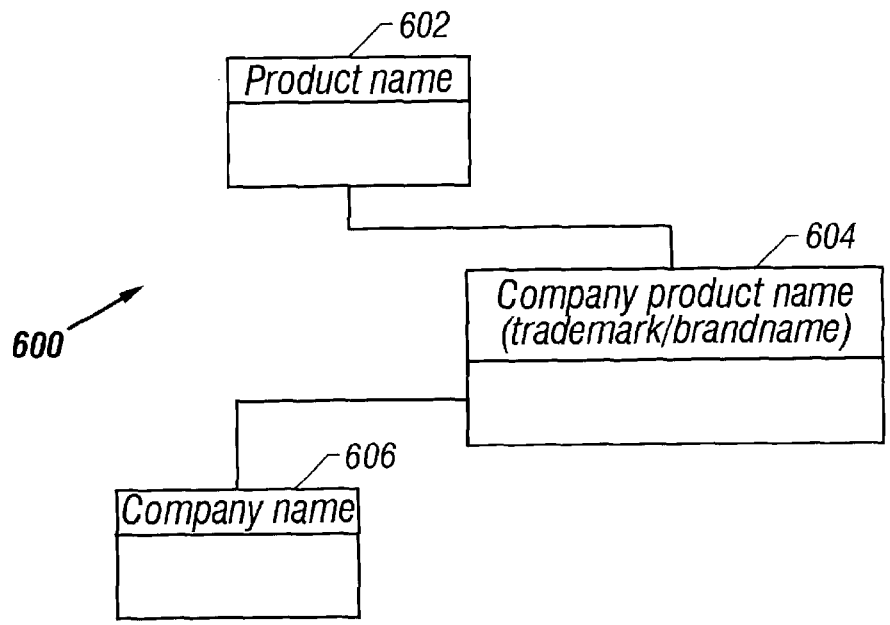
FIG. 6 is a block diagram of a database structure that allows the building of a product hierarchy where companies can be related or associated to an appropriate product level through the trademark/brandname of its products.

In FIG. 6, a database structure 600 uses a product name record 602, a company-product name or trademark/brandname record 604, and a company name record 606. Each record can then be freely associated with each other record and its individual records.

Referring once again to FIG. 2, when a node level in the product hierarchy 206 is created, there are two methods for inputting data that are mutually exclusive. In a first method, a company which has a product and a corresponding brandname or tradename can be attached to a lowest product level. This action thereafter defines that product level as the lowest level in the chain. In a second method, another product level is attached by creating a new level in the product hierarchy 206. Once a company and its product has been assigned to a hierarchy level, it becomes associated at every higher level in the product hierarchy for that particular chain of connection by default. As a result, companies can be associated with the highest to the lowest hierarchy levels.

Database 200 hierarchically categorizes companies in company records 214 into appropriate industries, sub-industries, sectors, sub-sectors, and groups based solely upon their respective product or services. The product hierarchy 206 therefore is the only mechanism that defines how a company is to be categorized within an industry, sector, sub-sector, or group. This is a critical way in which the invention is distinguished over the prior art.

The result of this product hierarchy 206 and companies being attached at the lowest level is that proper industries, sectors, sub-sectors, and groups are created. The highest level in the product hierarchy would define the broadest industries, sectors, sub-sectors, and groups, with the greatest number of companies making up that industry, sector, sub-sector, or group. As one scales down the product hierarchy, industries, sectors, sub-sectors, and groups are narrowed, becoming more refined and specific, eventually getting down to the lowest levels with fewer companies. These industries, sectors, sub-sectors, and groups can then be looked at to track performance, relative to other industries, sectors, sub-sectors, and groups or individually on any quantitative and certain qualitative parameters. By definition, industries, sectors, sub-sectors, and groups are created at every product level in the product hierarchy. The central point is that any of these industries, sectors, sub-sectors, and groups can be evaluated on any quantitative and certain qualitative parameters.

Therefore, system 100 (FIG. 1) provides the ability to display systematically, search, and compare all companies and peer groups, based upon products manufactured or services performed anywhere within an industry, sector, sub-sector, and group, as well as perform industry, sector, sub-sector, and group by industry, sector, sub-sector, and group comparisons.

Another critical aspect of the invention is that all of the qualitative data 114 (FIG. 1) that is related to a company is selectively parsed and placed into separate fields for each item, e.g. Tables I–II. Such fields are given specific database linkages that allow the data to be associated or linked to other data. This provides the database 200 with enough flexibility to perform data mining and to drill down for specific information. Searches can be performed on any data element in database 200.

Information about an individual company's products or services, by brandname or tradename, is loaded in a separate record. It will be appreciated that the terms "products" and "services" are used interchangeably herein. Each company's products record 266 is linked or related to its general company information record 214. Each company that produces a product in a product hierarchy 206 is associated to that product's level in the product hierarchy through a company products record 260. If a company does not have a tradename or brandname for its product, and the data entry field is therefore left blank at the data entry stage 118 (FIG. 1), an identifier (ID) is nevertheless automatically assigned so such company can still be linked or associated to a product level in a corresponding hierarchy. Redundant product tradenames may be attached at many, bottom node levels in the product hierarchy. A company can have one of its products attached at multiple, lowest product levels in the product hierarchy. A company may have an unlimited number of products.

Product records can be specialized for particular industries, sectors, sub-sectors, and groups. For example, the company product record for medical device and bio-pharmaceutical companies preferably includes information fields for each products clinical and regulatory stage, side effects, and prescription indications.

An individual company can be related to some other company or entity for any number of reasons. A two-way database association is implemented by linking two separate records to the general company record 214 through a many-to-many relationship. The two record links are the association and is represented by the double lines between company record 214 and company associations record 228 in FIG. 2. The company association type record 232 identifies why the two entities are related, and/or otherwise explains the basis for the association. Association types can include customers, strategic partners, corporate and venture shareholders, equipment suppliers, and component suppliers. An unlimited number of association types can be created. Such structure allows a user to search by a particular association type. For example, list all of the customers for company A or list all the companies that have company A as a customer. In another example, if company A has company B as a customer, then from company B's perspective company A could be either a component or equipment supplier.

The geographic dispersion of revenues and manufacturing can be recorded for each individual company. Preferably, the database structure for this is processed in three separate records 222, 224, and 226. These are related to each other and are related as a group to the general company record 214. The same geographic areas can be related to any number of otherwise independent companies. This allows searches to be done based on the type of activity, sales or manufacturing, as well as the geographic area, to produce any and all companies that meet the criteria.

Revenue percentage figures can be attached to every one of a company's products. A data field is included to store the percentage of revenue a company generates for each product. Such revenue percentage value can be attached at any level in a product hierarchy, lowest to highest for a particular company for its products. Therefore, if a figure has been entered at a higher level in the product hierarchy, it may represent the percentage of revenue generated for more than one company product. If such company has multiple products associated at lower levels in the product hierarchy, the sum of the figures entered for a company may not exceed one hundred percent. A search by query manager 110 is satisfied if a figure is entered at a lower level in the product hierarchy and the user nevertheless sets a parameter based on a higher level in the chain.

End-user market records 236 are attached to each company market record 234 and company record 214 for each one of the company's products. An association is made to both the company's products as well as the product hierarchy 206. Such information can be attached at any level in the product hierarchy for a company. Multiple end-user markets can be associated to one product level for a company. A list of the end-user markets is loaded in what is called a reference, or code record where consistency can be maintained much more effectively and eliminate duplicate entries that may be spelled slightly differently. When assigning an end-user market, one must be selected from the available list in the code record. The code record can be unlimited in the number of end-user markets entered. The same end-user market can be attached or associated to many products Regulatory agencies that affect a company are identified. Such information is loaded in a separate record which is then related to the company regulated. One regulatory agency can be associated to an unlimited number of companies. Each company can have an unlimited number of agencies related to it. This allows for searching by a particular agency resulting in any and all companies that are affected by that agency.

Information regarding each company's management team and directors-is loaded in a single record structure, which is then related to the company record.

Each company in database 200 has certain generic business strategies associated to it. These strategies are loaded in a separate record. One company can have multiple strategies associated to it. Each strategy can have an unlimited number of companies related. This allows searches on a particular strategy to result in all the companies that have been identified as having that strategy.

Product market trend can be associated to any and every product in the product hierarchy, product level dependent but company independent (see FIG. 7). The trends are loaded in a reference record. When associating a trend to a product, one must be selected from the reference record. One product can contain multiple trends. One trend can be attached to multiple products. A total-available-market figure can be attached or associated to each product throughout the product hierarchy. When a new product level name is created in the product hierarchy a separate field exists to enter the total-available-market figure for that product

User Interface

In the preferred embodiment of the claimed invention, two subsections, News Alerts and Performance Alerts, are created. In each section, users may browse their existing alerts, modify their existing alerts, and subscribe to new alerts. Users can also specify a format for each alert, for example, text, HTML, or XML.

Limited Subscription Functionality for Non-Paying Users

In the preferred embodiment, limited access to subscription functionality is allowed for users who pay only for alerts, and not for use of other parts of a parent software system utilizing the proprietary product-hierarchy database system. Such users are provided with a simplified subscription tool. The tool limits the ability of these users to have access of up to N levels of the proprietary products/services hierarchy when browsing the hierarchy to set alerts. N is controllable, and in the preferred embodiment is set to 3.

Main Components of Alert System

Figure 8:
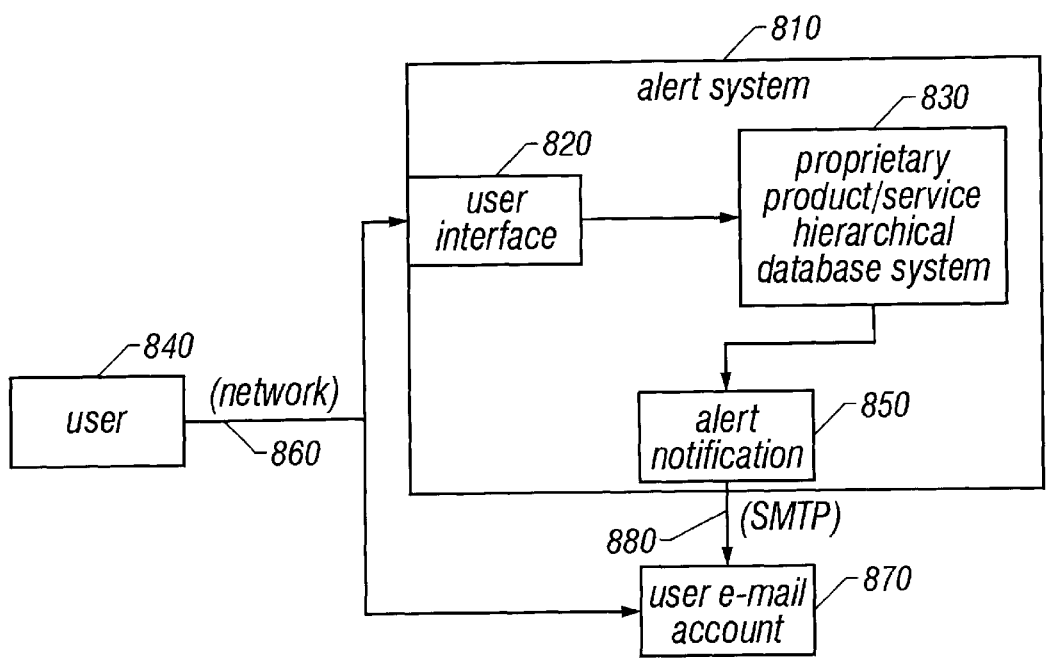
FIG. 8 is a block diagram of the main components according to the invention.

FIG. 8 is a block diagram of the main components, according to the invention. An alert system 810 comprises a user interface component 820, which has access to a proprietary product/service hierarchical categorization 830. In the preferred embodiment, the proprietary product/service hierarchical categorization is implemented in a computerized database system. A user 840 specifies criteria according to the invention for an alert notification 850 using the alert system user interface 820 over a network 860. In the preferred embodiment, the network 860 is an Internet connection and the alert system 810 comprises a production software application accessible over the World Wide Web. After the user 840 sets criteria for an alert notification 850, the alert system 810 creates and sends the alert notification 850 to the user's e-mail account 870 using SMTP 880. It should be appreciated that the alert notification can be sent to any specified e-mail account and that it doesn't have to belong to the user. It should be appreciated that multiple alerts can be set by the user for a single category, and it should be appreciated that the user can modify and browse exiting alerts in the system 810.

Figure 9:
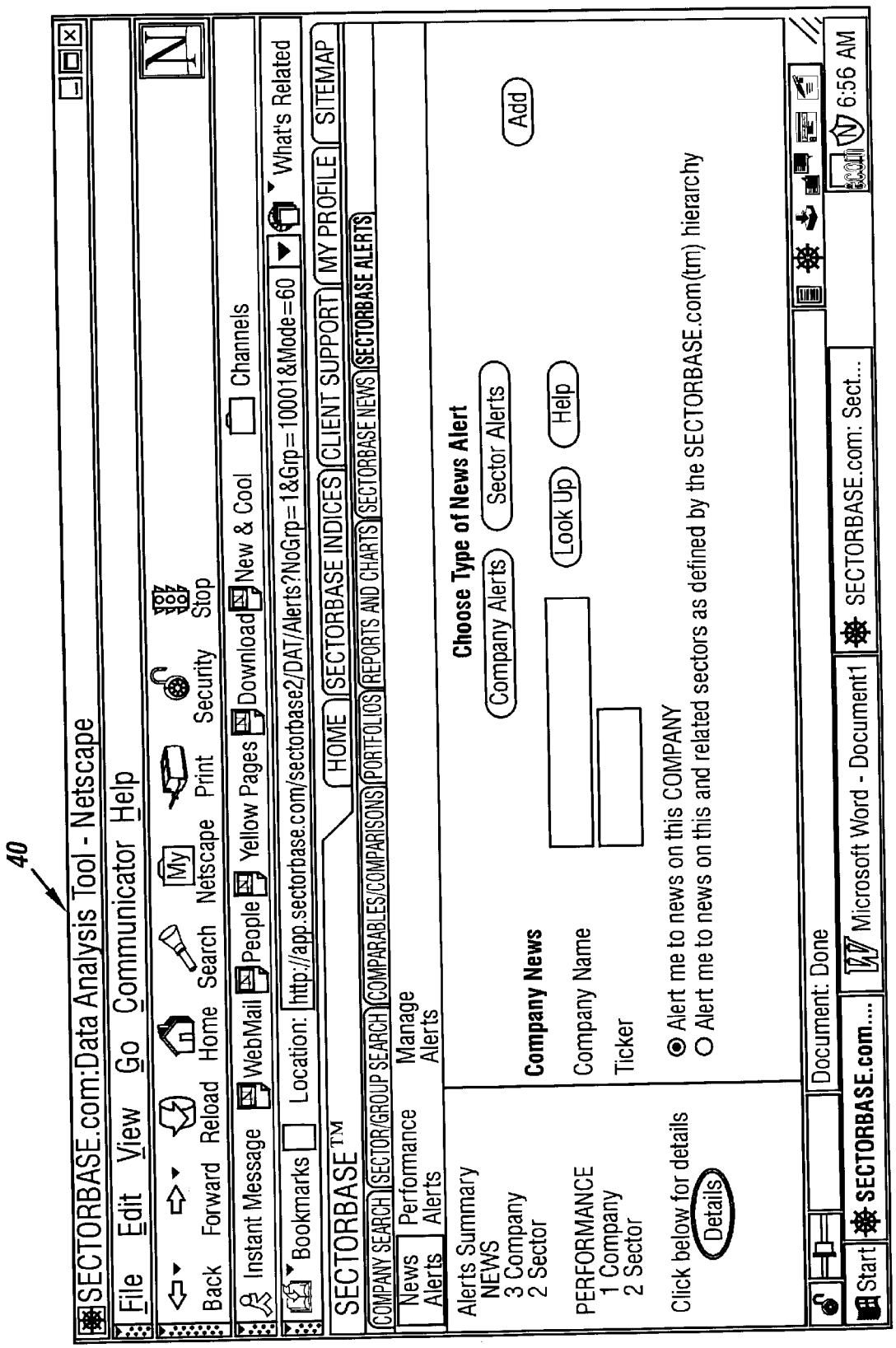
FIG. 9 is a screen print for setting a company news alert according to the invention.

FIG. 9 is a screen print of the preferred embodiment for setting a company news alert according to the invention.

Figure 10:
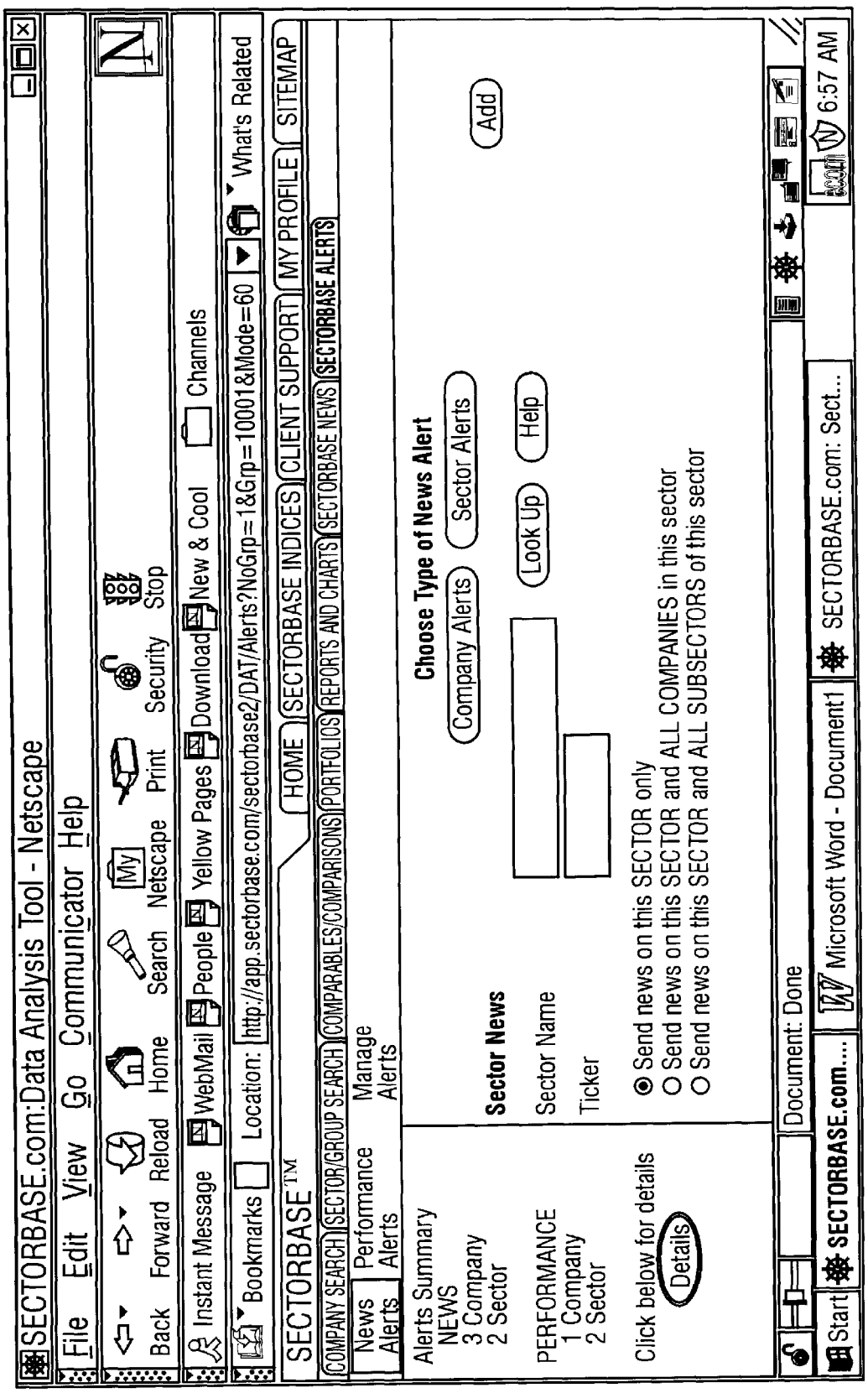
FIG. 10 is a screen print for setting a sector news alert according to the invention.

FIG. 10 is a screen print of the preferred embodiment for setting a sector news alert according to the invention.

Figure 11:
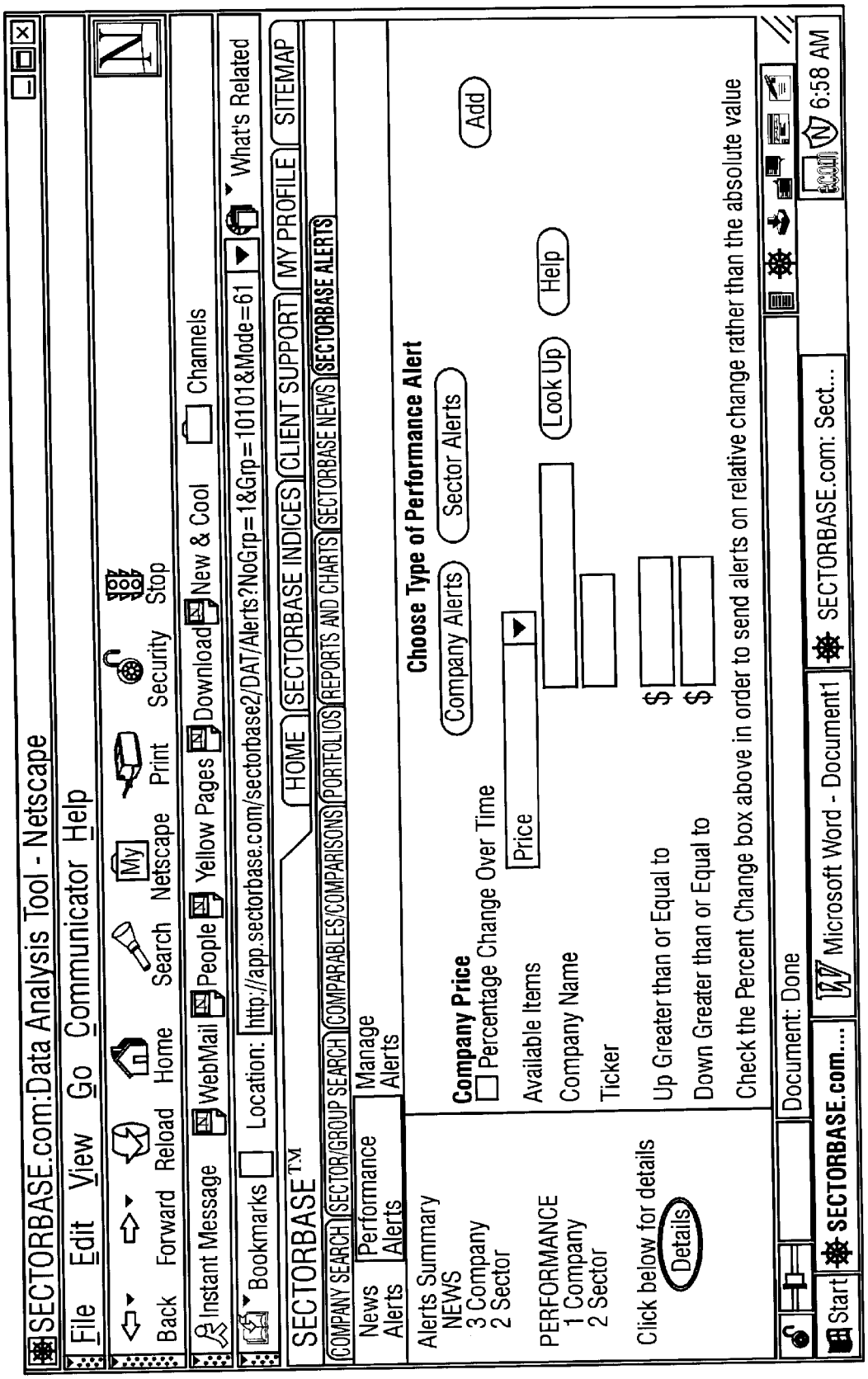
FIG. 11 is a screen print for setting a company performance alert according to the invention.

FIG. 11 is a screen print of the preferred embodiment for setting a company performance alert according to the invention.

Figure 12:
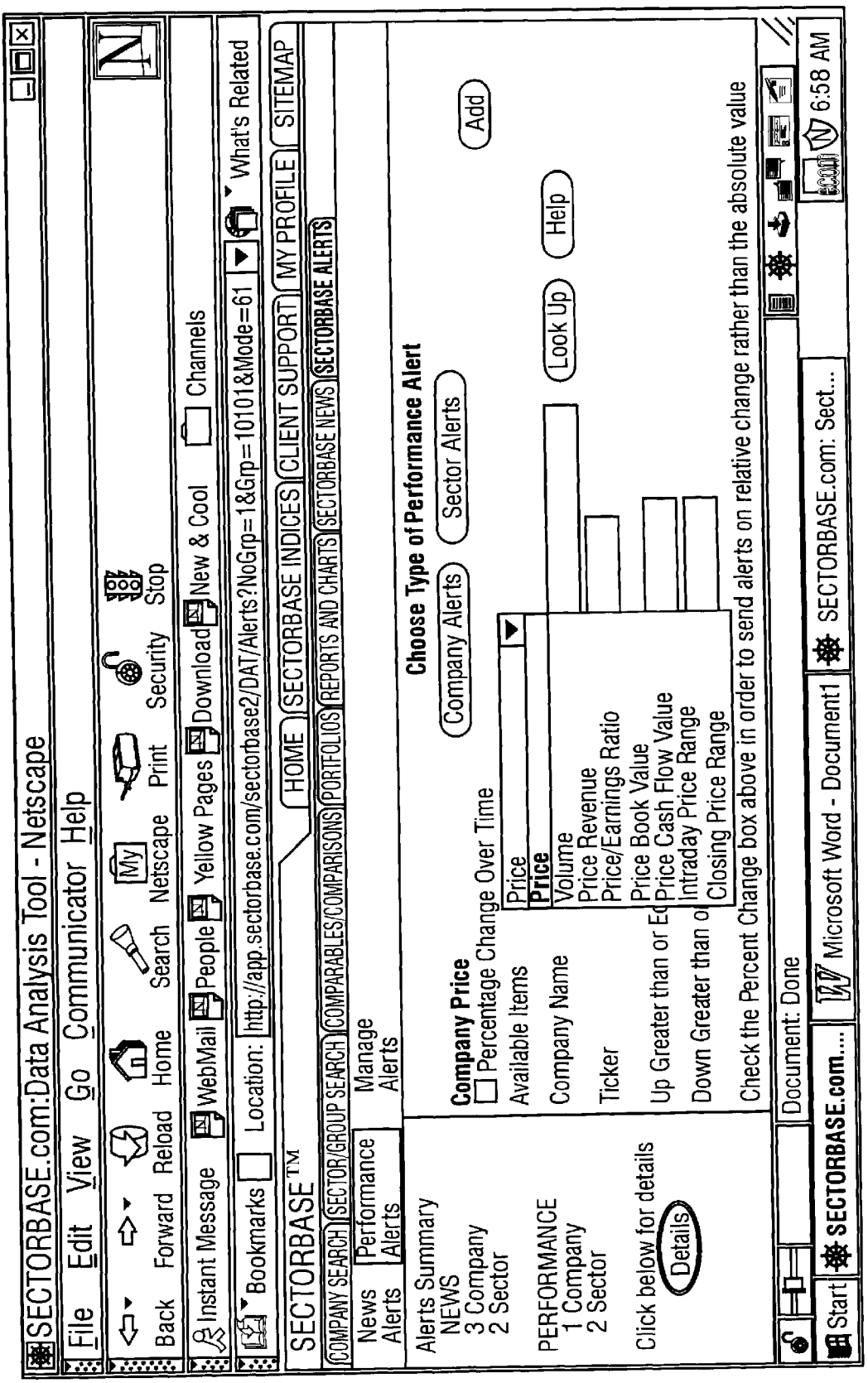
FIG. 12 is a screen print for setting a company performance alert showing a list of performance alert items according to the invention.
Figure 13:
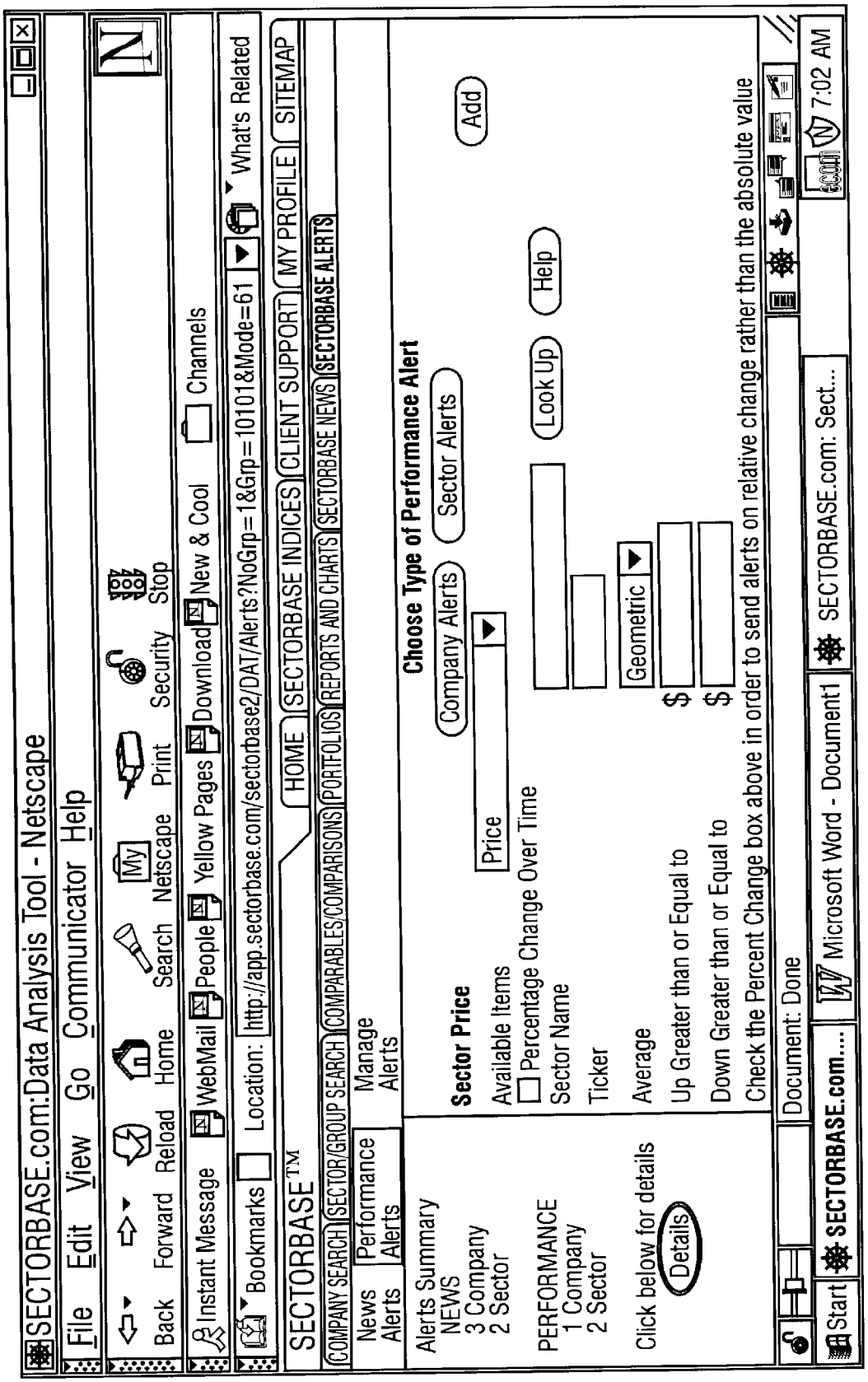
FIG. 13 is a screen print for setting a company performance alert for a price item and for a geometric average according to the invention.

FIG. 12 is a screen print of the preferred embodiment showing a list of performance alert items for setting a company performance alert according to the invention;

FIG. 13 is a screen print of the preferred embodiment for setting a company performance alert for a price item and for a geometric average according to the invention.

Figure 14:
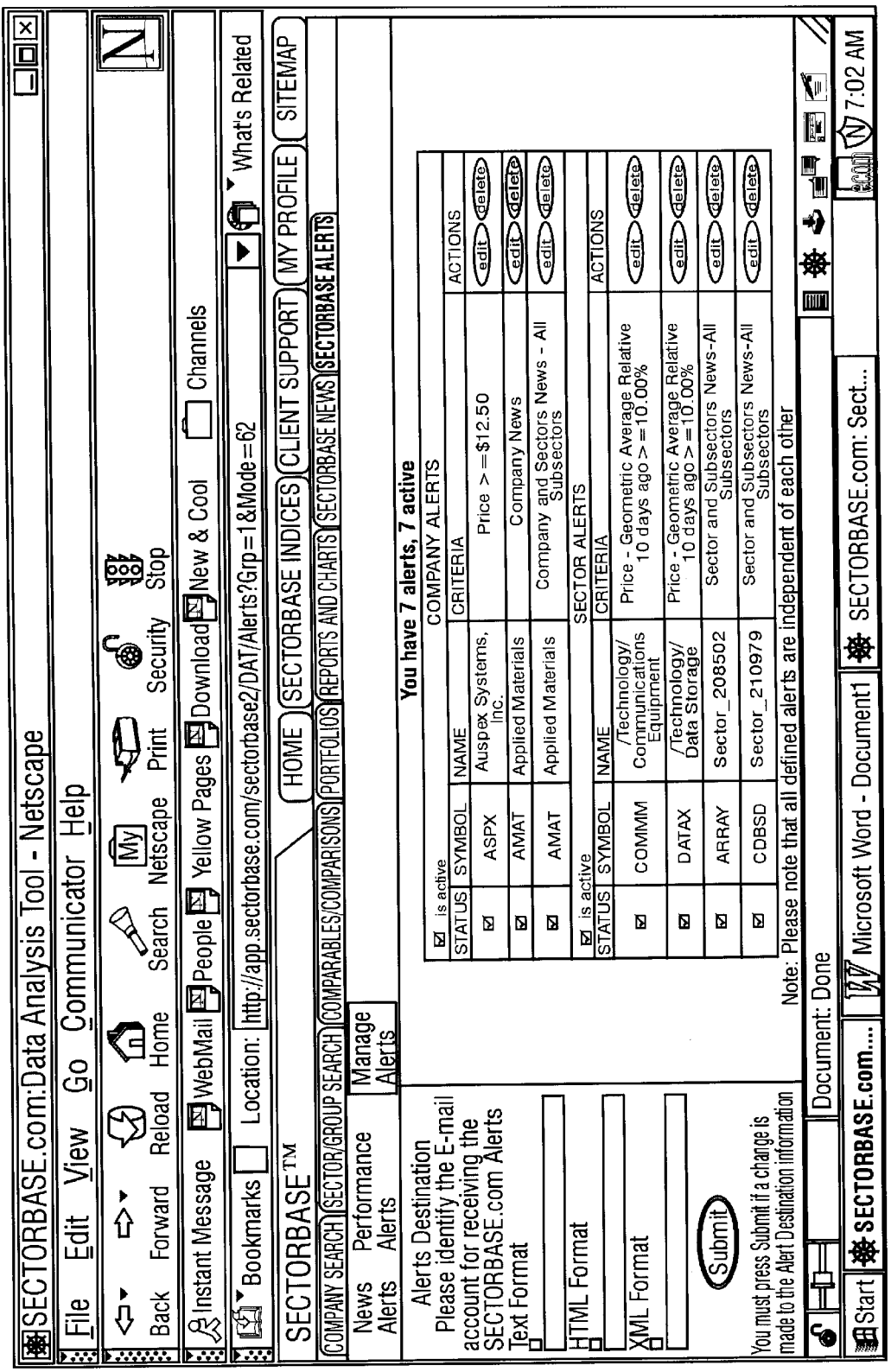
FIG. 14 is a screen print for browsing existing company and sector alerts that are both news and performance alerts according to the invention.

FIG. 14 is a screen print of the preferred embodiment for browsing existing company and sector alerts that are both news and performance alerts according to the invention.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. An alert system for delivering an alert notification to a user, comprising:
   a user interface means, whereby said user can interact with said system;
   means for allowing said user to set, modify, and browse said alert notification; and
   means for delivering said alert notification to said user;
   wherein said means for allowing said user to set, modify, and browse said alert notification comprises a product/service hierarchy methodology for categorization of companies, said categorization automatically extending said delivering means to a plurality of other alert notifications associated with any of subsidiary classifications, constituent companies' classifications, or securities instruments.

2. The system of claim 1, wherein using said user interface, said user specifies a text, HTML, or XML format for delivering said alert notification and said plurality of other alert notifications.

3. The system of claim 1, wherein said means for delivering said alert notification and said plurality of other alert notifications comprises e-mail using standard SMTP Internet mail protocol.

4. The system of claim 1, wherein said means for delivering said alert notification and said plurality of other alert notifications comprises XML and push technology.

5. The system of claim 1, wherein said means for allowing said user to set, modify, and browse said alert notification comprises a product/service hierarchy classification database system associated with said product/service hierarchy methodology.

6. The system of claim 5, wherein said alert notification is a news alert.

7. The system of claim 6, wherein said news alert is associated with a user-specified company.

8. The system of claim 7, wherein said news alert notification is associated with a sector of a plurality of sectors to which said user-specified company belongs.

9. The system of claim 6, further comprising functionality for looking up a ticker symbol or a company name.

10. The system of claim 6, wherein said news alert is associated with a user-specified sector.

11. The system of claim 10, wherein said news alert is associated with one of a plurality of companies belonging to said user-specified sector.

12. The system of claim 10, wherein said news alert is associated with a sub-sector of a plurality of sub-sectors belonging to said user-specified sector.

13. The system of claim 6, further comprising product browser functionality for said user to select a user-specified sector.

14. The system of claim 6, wherein said news alert is sent substantially immediately after a news item meets a selected criteria, until said selected criteria is deleted from said system.

15. The system of claim 5, wherein said alert is a performance alert.

16. The system of claim 15, wherein said performance alert is associated with a user-specified company or a user-specified sector.

17. The system of claim 16, wherein said performance alert is of a first category, wherein data for said performance alert is monitored intraday and said performance alert is sent substantially immediately after a first user-selected criteria is met.

18. The system of claim 17, wherein said substantially immediately sent performance alert becomes inactive and is reactivated automatically each morning of a new day.

19. The system of claim 18, further providing said user with a manual means for reactivating said inactive alert.

20. The system of claim 17, further providing said user with a means for specifying that said alert is monitored in absolute terms, or in relative terms to a closing price on a prior day.

21. The system of claim 20, wherein means for specifying in relative terms further comprises specifying a number of days ago.

22. The system of claim 21, wherein zero days ago is close on a preceding day.

23. The system of claim 17, wherein said first category comprises any of:
   a price change item, wherein for said user-specified sector, said user specifies a geometric average, an arithmetic average, or a market capitalization weighted average;
   a volume change item, wherein for said user-specified sector uses simple average;
   a price/revenue item, wherein for said user-specified sector uses simple average;
   a price/earnings item, wherein for said user-specified sector uses simple average;
   a price/book value item, wherein for said user-specified sector uses simple average; and
   a price/cash flow item, wherein for said user-specified sector uses simple average.

24. The system of claim 16, wherein said performance alert is of a second category, wherein data for said performance alert is monitored during a day and said performance alert is sent after a second user-selected criteria is met only at the end of said day.

25. The system of claim 24, further providing said user with a means for specifying that said alert is monitored in relative terms to a closing price on a prior day.

26. The system of claim 25, wherein means for specifying in relative terms further comprises specifying a number of days ago.

27. The system of claim 26, wherein zero days ago is close on a preceding day.

28. The system of claim 24, wherein said second category comprises:
   an intraday range item, wherein said user specifies a percentage range of an opening price, and wherein said first formula is (high−low)/opening price;
   a closing item, wherein two values are provided, said first value being a percentage from the top from a close price, wherein said second formula is (high−close)/(high−low), and said second value being a percentage from the bottom of said close price, wherein said third formula is (close−low)/(high−low).

29. The system of claim 1, wherein said user has limited access of up to a predetermined number of levels, N, of said proprietary product/service hierarchy classification.

30. The system of claim 29, wherein N is 3.

31. The system of claim 1, said means for delivering further comprising multiple alert notifications on a same category, wherein each of said multiple alert notifications is sent by said system and received by said user independently.

32. A method for delivering from an alert system an alert notification to a user, comprising the steps of:
   providing a user interface means, whereby said user can interact with said system;
   allowing said user to set, modify, and browse said alert notification; and
   delivering said alert notification to said user;
   wherein said step for allowing said user to set, modify, and browse said alert notification uses a product/service hierarchy methodology for categorization of companies, said categorization automatically extending said delivering step to a plurality of other alert notifications associated with any of subsidiary classifications, constituent companies' classifications, or securities instruments.

33. The method of claim 32, wherein using said user interface, said user specifies a text, HTML, or XML format for delivering said alert notification and said plurality of other alert notifications.

34. The method of claim 32, wherein said delivering step comprises e-mail using standard SMTP Internet mail protocol.

35. The method of claim 32, wherein said delivering step uses XML and push technology.

36. The method of claim 32, wherein said allowing step uses a product/service hierarchy classification database system associated with said product/service hierarchy methodology.

37. The method of claim 36, wherein said alert notification is a news alert.

38. The method of claim 37, wherein said news alert is associated with a user-specified company.

39. The method of claim 38, wherein said news alert notification is associated with a sector of a plurality of sectors to which said user-specified company belongs.

40. The method of claim 37, further comprising functionality for looking up a ticker symbol or a company name.

41. The method of claim 37, wherein said news alert is associated with a user-specified sector.

42. The method of claim 41, wherein said news alert is associated with one of a plurality of companies belonging to said user-specified sector.

43. The method of claim 41, wherein said news alert is associated with a sub-sector of a plurality of sub-sectors belonging to said user-specified sector.

44. The method of claim 37, wherein said allowing step further comprises product browser functionality for said user to select a user-specified sector.

45. The method of claim 37, further comprising the step of sending said news alert substantially immediately after a news item meets a selected criteria, until said selected criteria is deleted from said system.

46. The method of claim 36, wherein said alert is a performance alert.

47. The method of claim 46, wherein said performance alert is associated with a user-specified company or a user-specified sector.

48. The method of claim 47, wherein said performance alert is of a first category, wherein data for said performance alert is monitored intraday and said performance alert is sent substantially immediately after a first user-selected criteria is met.

49. The method of claim 48, wherein said substantially immediately sent performance alert becomes inactive and is reactivated automatically each morning of a new day.

50. The method of claim 49, further comprising the step of providing said user with a manual means for reactivating said inactive alert.

51. The method of claim 48, further comprising the step of providing said user with a means for specifying that said alert is monitored in absolute terms, or in relative terms to a closing price on a prior day.

52. The method of claim 51, wherein means for specifying in relative terms further comprises specifying a number of days ago.

53. The method of claim 52, wherein zero days ago is close on a preceding day.

54. The method of claim 48, wherein said first category comprises any of:
   a price change item, wherein for said user-specified sector, said user specifies a geometric average, an arithmetic average, or a market capitalization weighted average;
   a volume change item, wherein for said user-specified sector uses simple average;
   a price/revenue item, wherein for said user-specified sector uses simple average;
   a price/earnings item, wherein for said user-specified sector uses simple average;
   a price/book value item, wherein for said user-specified sector uses simple average; and
   a price/cash flow item, wherein for said user-specified sector uses simple average.

55. The method of claim 47, wherein said performance alert is of a second category, wherein data for said performance-alert is monitored during a day and said performance alert is sent after a second user-selected criteria is met only at the end of said day.

56. The method of claim 55, further comprising the step of providing said user with a means for specifying that said alert is monitored in relative terms to a closing price on a prior day.

57. The method of claim 56, wherein means for specifying in relative terms further comprises specifying a number of days ago.

58. The method of claim 57, wherein zero days ago is close on a preceding day.

59. The method of claim 55, wherein said second category comprises:
   an intraday range item, wherein said user specifies a percentage range of an opening price, and wherein said first formula is (high−low)/opening price;
   a closing item, wherein two values are provided, said first value being a percentage from the top from a close price, wherein said second formula is (high−close)/(high−low), and said second value being a percentage from the bottom of said close price, wherein said third formula is (close−low)/(high−low).

60. The method of claim 32, wherein said user has limited access of up to a predetermined number of levels, N, of said proprietary product/service hierarchy classification.

61. The method of claim 60, wherein N is 3.

62. The method of claim 32, wherein said delivering step further comprises multiple alert notifications on a same category, wherein each of said multiple alert notifications is sent by said system and received by said user independently.

63. A method for a user to add news alerts to an alert system, comprising the steps of:
   entering a company name of a company or a ticker number of said company associated with a company news alert;
   finding an entry in a database associated with said company and with said company news alert;
   selecting either to be alerted to news on said company or to news on said company and related sectors, wherein said selection is associated with said company news alert;
   selecting to add said specified company news alert to said system;
   entering a sector name of a sector, a ticker number, or selecting said sector name from a list of sector names, said sector associated with a sector news alert;
   selecting any combination of:
      send news on sector only,
      send news on sector and on all companies in said sector, and
      send news on sector and on all sub-sectors; wherein said selection is associated with a sector news alert; and
   selecting to add said specified sector news alert to said system.

64. The method of claim 63, wherein said news alerts are sent continuously each time there is news that meets selected criteria.

65. The method of claim 63, further comprising the step of providing lookup functionality, whereby said user uses said ticker number to find said entry in said database.

66. The method of claim 63, further comprising the step of providing for said user a means to subscribe to multiple alerts on either of:
   said company; or
   said sector; and
   wherein each of said multiple alerts is sent and received independently.

67. The method of claim 63, wherein said list of sector names is a product/service hierarchy.

68. A method for a user to add performance alerts to an alert system, comprising the steps of:

selecting one of a company performance alert or a sector index performance alert;

entering either of:
- a company name of a company or a ticker number of said company associated with a company performance alert, or
- a sector name of a sector or a ticker number of said company associated with a sector index performance alert;

selecting one of a set of available criteria items;

deciding if said selected item is of a first category or a second category;

entering appropriate data associated with said selected criteria item; and adding said performance alert to said system.

69. The method of claim 68, further comprising the step of providing said user with a lookup functionality to aid said user in finding an associated entry in a database.

70. The method of claim 68, further comprising the step of providing for said user a means to subscribe to multiple alerts on either of:
- said company; or
- said sector; and
- wherein each of said multiple alerts is sent and received independently.

71. The method of claim 68, wherein said set of available criteria items comprises any of:
- price;
- volume;
- price revenue;
- price/earnings ratio;
- price book value;
- price cash flow value;
- intraday price range;
- closing price range; and
- wherein said first category comprises said first six said criteria items and said second category comprises said last two said criteria items.

72. The method of claim 71, wherein said performance alert associated with said second category is sent at end of day only.

73. The method of claim 71, wherein for said sector and said first category, calculated values comprise geometric average, arithmetic average, and market capitalization weighted average, and wherein for said sector and said second category, calculated values comprise simple average.

74. The method of claim 71, wherein for said second category, calculated values comprise any of:
- (high−low)/open, for intraday price range;
- (high−close)/(high−low), for closing price range; and
- (close−low)/(high−low), for closing price range.

75. The method of claim 68, wherein said data is monitored continuously intraday, said alert is sent substantially immediately as soon as said criteria is met, said alert becomes inactive for the rest of the day, and said alert is reactivated in the morning of a new day.

76. The method of claim 75, wherein said user can manually reactivate said inactive alert.

77. The method of claim 68, further comprising the step of providing said user functionality to specify whether said alert will be monitored in absolute terms or in relative terms, relative to a closing price on a previous day.

78. The method of claim 77, wherein for relative terms said functionality further comprises ability to specify a number of days ago, wherein zero days ago defaults to close on a preceding day.

* * * * *